March 30, 1943.        J. N. FEES.        2,315,091
LOADER
Filed Nov. 3, 1941        2 Sheets-Sheet 1
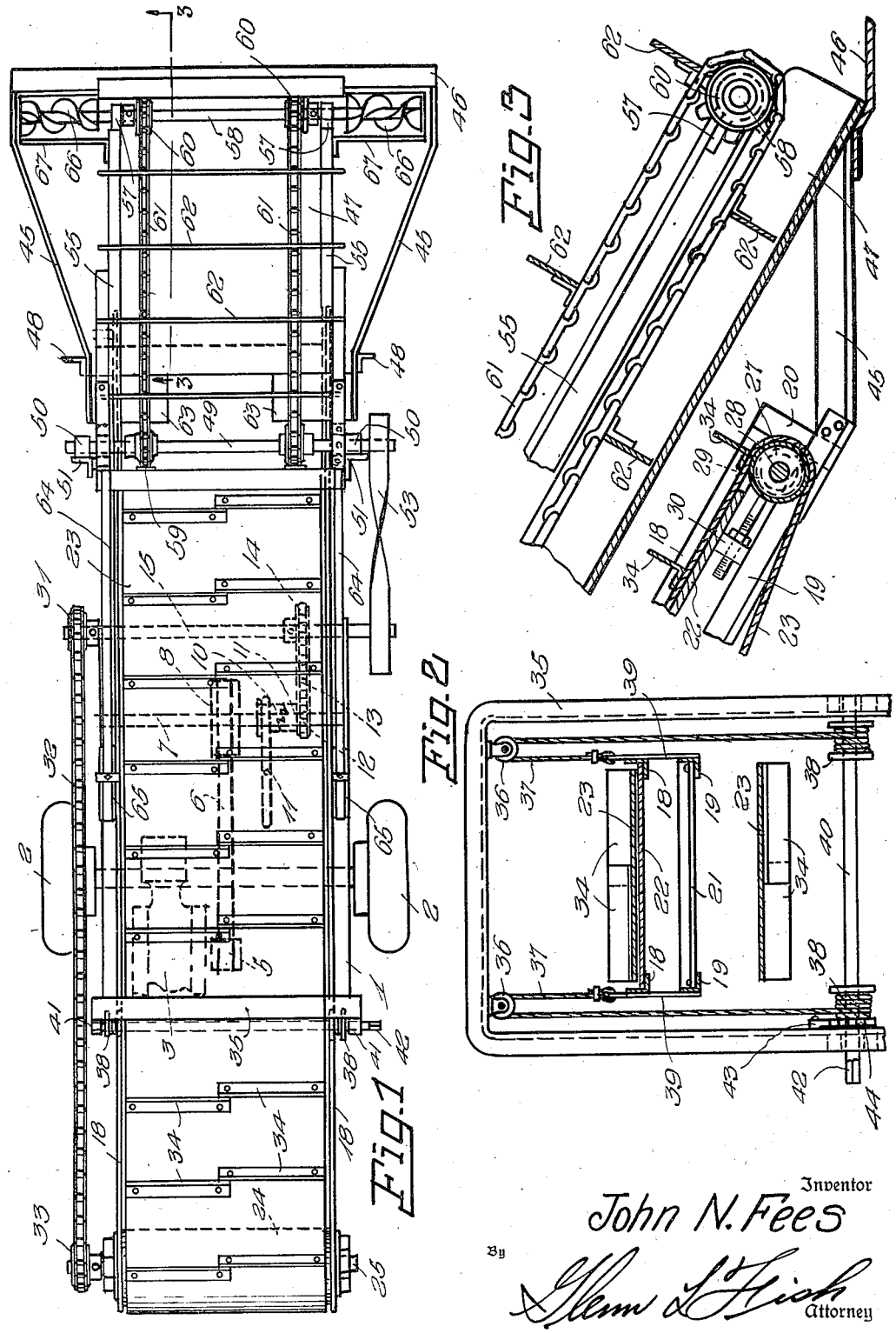
Inventor
John N. Fees
By
Glenn L. Fish
Attorney March 30, 1943.  J. N. FEES  2,315,091
LOADER
Filed Nov. 3, 1941  2 Sheets-Sheet 2
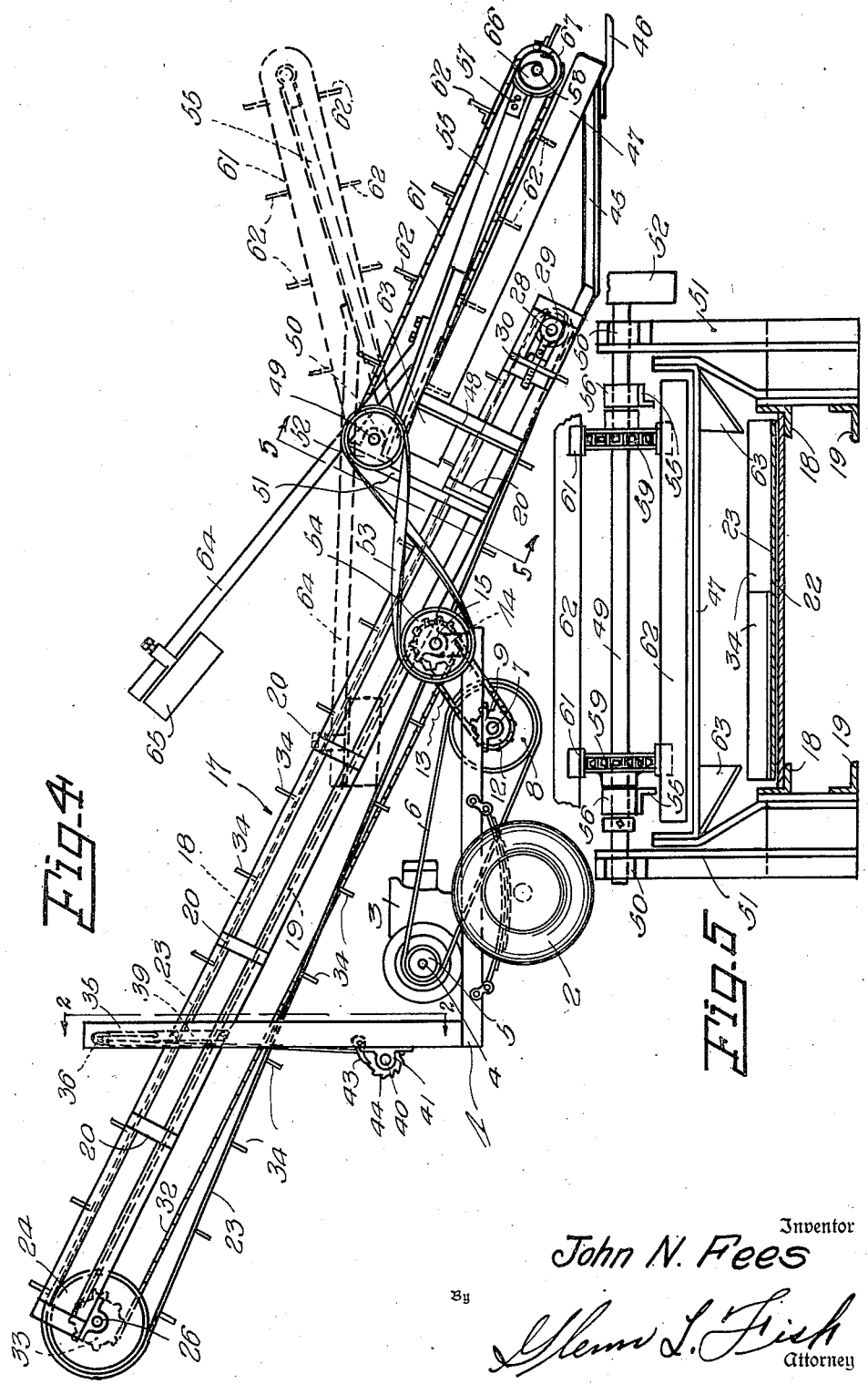
Inventor
John N. Fees
By
Glenn L. Fish
Attorney Patented Mar. 30, 1943

2,315,091

UNITED STATES PATENT OFFICE 2,315,091

LOADER

John N. Fees, Spokane, Wash.

Application November 3, 1941, Serial No. 417,695

2 Claims. (Cl. 198—9)

This invention relates to a loader and more particularly to a loader by means of which grain and other material may be removed from a pile and transferred to wagons or other vehicles in which it is to be transported to a storehouse or other destination.

Another object of the invention is to provide a loader including a main conveyor and an auxiliary conveyor at the front of the main conveyor for removing material from the pile and depositing it upon the main conveyor by means of which it is moved upwardly and deposited in the wagon.

Another object of the invention is to provide a loader wherein the main conveyor is pivoted for tilting adjustment upon a portable carriage in order that it may be angularly adjusted to accommodate itself to the vehicle body into which the material is to be deposited, the carriage being provided with a yoke carrying means for shifting the rear end of the main conveyor vertically and holding it in adjusted position.

Another object of the invention is to provide a loader of this character wherein the main conveyor has an endless belt provided with cross strips or fins so arranged that the belt may be flexed transversely.

Another object of the invention is to provide the loader with a main conveyor having a shoe at its front end constituting a ground-engaging support for the front of the conveyor and also serving as a support for the front end of a pan for an auxiliary conveyor by means of which material is delivered from the pile onto the main conveyor.

Another object of the invention is to provide an auxiliary conveyor which is pivoted for vertical tilting from a lowered position for use, to a raised position.

Another object of the invention is to provide the auxiliary conveyor with a shaft at its front end which not only carries sprockets for engagement by chains of the auxiliary conveyor but has its end portions extended and carrying screw conveyors for moving the material toward a position in which it may be carried upwardly by the auxiliary conveyor.

Another object of the invention is to provide a loader so constructed that it may be easily transported from place to place and, when in position, driven by a motor mounted on the platform of the carriage.

In the accompanying drawings:

Fig. 1 is a top plan view of the improved loader.

Fig. 2 is a sectional view taken vertically on the line 2—2 of Fig. 4.

Fig. 3 is a sectional view on an enlarged scale, on the line 3—3 of Fig. 1.

Fig. 4 is a side elevation of the loader.

Fig. 5 is a transverse sectional view on the line 5—5 of Fig. 4.

This improved loader is employed for transferring wheat or other free running material from a pile into wagons for transportation from the pile to a storage building or other destination, and has a carriage 1 provided with wheels 2 in order that it may be readily moved from place to place. A motor 3 is mounted on the platform of the carriage and the shaft 4 of this motor carries a pulley 5 in order that a belt 6 may be trained about the pulley and transmit rotary motion to a shaft 7 carrying a larger pulley 8 about which the belt is also trained. This shaft 7 is rotatably mounted transversely of the carriage in bearings 9, at opposite sides of the carriage, and carries a clutch member 10 which turns with the shaft and is shiftable along the shaft into and out of position for engagement with a companion clutch member 11 carried by a sprocket wheel 12 loose upon the shaft. A sprocket chain 13, trained about the sprocket 12, also engages about a sprocket wheel 14 carried by a second shaft 15 extending transversely of the carriage and rotatably mounted through bearings carried by the carriage at opposite sides thereof. The shaft 15 also passes through bearings 16 at opposite sides of a main conveyor 17 and mounts the conveyor for vertical tilting adjustment.

The main conveyor extends longitudinally of the carriage and has a frame consisting of upper and lower side bars 18 and 19 held in vertical spaced relation to each other by strips 20, the lower bars being braced transversely by a suitable number of cross strips or bars 21 and the upper bars carrying a pan 22 extending longitudinally of the frame substantially the full length thereof. An endless belt 23 extends longitudinally of the frame and has its rear portion trained about a roller 24 carried by a shaft 25 which extends transversely of the conveyor frame and is rotatably mounted through bearings 26 carried by ends of the lower side bars 20. The forward portion of the conveyor belt is trained about a roller 27 carried by a shaft 28 rotatably supported by bearings 29, and by reference to Fig. 4, it will be seen that these bearings 29 are adjustably mounted through mounting strips or bars 30 in order that the shaft 28 may be adjusted longitudinally of the conveyor frame and the conveyor belt held at proper tension. The shaft 15 has its ends protruding from opposite sides of the carriage and the conveyor frame at one protruding end portion carries a sprocket wheel 31 about which is trained a sprocket chain 32. This chain extends longitudinally of the conveyor frame and its upper or rear end portion is trained about a sprocket wheel 33 carried by a protruding end portion of the shaft 25, so that when the shaft 15 is rotated, rotary motion will be imparted to the shaft 25 and the roller 24 carried thereby, and movement imparted to the conveyor belt longitudinally of the frame.

Cross fins 34 are mounted on the outer surface of the conveyor belt and extend transversely thereof, the fins being arranged in pairs, and the fins of each pair being each of slightly greater length than half the width of the belt and having their inner ends overlapped, as shown in Figs. 1 and 2. By this arrangement, the belts may be flexed transversely by the weight of grain carried by its upper flight and also flex transversely while passing about the rollers 24 and 27.

When the loader is to be used, it is necessary that the main conveyor be tilted from a reclining position to a raised position, in which position it extends rearwardly at an upward incline. In order that the conveyor may be so adjusted and supported in the adjusted position, there has been provided a yoke 35 carried by the carriage 1 and mounted vertically at the rear end thereof. This yoke carries pulleys 36 about which are trained ropes or cables 37 which are wound upon drums 38 and have their free upper ends secured to upper ends of strips 39 carried by the side bars of the conveyor frame. The drums 38 are fixed upon a shaft 40 rotatably mounted through bearings 41 carried by side arms of the yoke 35 and, when a crank is applied to the squared end 42 of the shaft and the shaft turned in a direction to wind the ropes upon the drums, the rear end of the conveyor will be swung upwardly to a raised position. A pawl or dog 43 carried by one side arm of the yoke engages a ratchet 44 fixed to the shaft 40 and releasably holds the shaft against retrograde rotation so that the conveyor will be held in raised position for extending over a wagon body to be filled with material carried upwardly by the upper flight of the conveyor belt. Side arms 45 extend forwardly from opposite sides of the front end of the lower side bars 19 of the conveyor frame and, at their front ends, are secured to ends of a shoe 46 resting on the ground during operation of the loader. The shoe also serves as a support for the front end of a pan 47 which extends longitudinally of the conveyor in spaced and substantially parallel relation thereto and has its rear end portion supported by struts 48 carried by the side bars of the conveyor frame.

The pan 47 forms part of an auxiliary conveyor which overlaps the forward portion of the main conveyor and, when grain or other material is moved rearwardly along the pan to the upper rear end thereof and drops from this pan, it will fall upon the upper flight of the conveyor belt of the main conveyor, by which it is then carried upwardly to the rear end of the main conveyor and over the roller 24 so that it falls into the wagon to be loaded. Over the pan is the endless material mover of the auxiliary conveyor, and this conveyor has a drive shaft 49 rotatably mounted through bearings 50 carried by uprights 51 which are secured against the side bars 18 and 19 of the main conveyor. One end of the shaft 49 carries a pulley 52 about which is trained a belt 53 having its rear portion trained about a pulley 54 carried by the shaft 15 and, since the belt 53 is twisted, the shaft 50 will be turned in a direction for rotating the shaft 49 in a direction opposite to that in which the shaft 15 turns. Side bars 55 have their rear ends connected with the shaft 49 by bearings 56 and are thus mounted for vertical swinging movement. At their front ends, the side bars carry bearings 57 through which a shaft 58 is rotatably mounted and the shafts 50 and 58 carry sprocket wheels 59 and 60 about which are trained conveyor chains 61 carrying cross blades or strips 62. The lower flights of the conveyor chains move upwardly and serve to carry grain or other material upwardly through the pan or trough 47 until the material reaches the upper rear end of the trough and is discharged therefrom onto the upper flight of the conveyor belt 23. Deflector plates 63 direct the falling grain upon the belt 23.

At times, the auxiliary conveyor is to be swung upwardly to the position indicated by dotted lines in Fig. 4. To accomplish this, there have been provided lever arms 64 secured at their front ends to the side bars 55 near the rear ends thereof. These lever arms extend rearwardly at an upward incline and, at their rear ends, carry counterweights 65 adjustable along the lever arms so that they may be shifted to positions in which they will so counterbalance the conveyor that, by grasping one of the lever arms and exerting forward pull, the conveyor may be easily swung upwardly toward elevated position.

It is desired to permit grain or other loose material to be removed from a pile over an area wider than the width of the pan 47 of the auxiliary conveyor and to do this, there have been provided screw conveyors 66 carried by end portions of the shaft 58 which protrude from opposite sides of the auxiliary conveyor. These screw conveyors operate in troughs 67 mounted at forward ends of the side bars 55 of the auxiliary conveyor and, when the auxiliary conveyor is in lowered position for use, outer ends of the troughs terminate substantially even with ends of the shoe 46. Therefore, when the loader is in use and moved to a position close to a pile of grain or other free running material, the forward portion of the pan and the endless mover of the auxiliary conveyor will be thrust into the material and, as the screw conveyors turn, they will move the material toward inner ends of the troughs 67 and the blades of the endless mover will engage the grain as they move downwardly about the sprockets 60 and carry the grain upwardly along the pan 47. When the material reaches the upper rear end of the pan, it flows downwardly between the deflector plates 63 and onto the upper flight of the conveyor belt 23 of the main conveyor. The blades 34 of this conveyor belt will then carry the material upwardly to the upper rear end of the main conveyor and, as the belt passes downwardly about the roller 24, the material will drop into a wagon or other vehicle over which the upper end of the main conveyor projects.

By turning the shaft 40, the main conveyor may be shifted vertically and held at such a height that its rear end projects over the vehicle without the blades 34 of the belt 23 striking the vehicle as they move forwardly. Since the strips or blades 34 are arranged in pairs having their inner ends overlapped midway the width of the belt 23, the upper flight of this belt may be flexed transversely to provide a somewhat trough-shaped upper flight for holding the material upon the belt and also permitting the belt to move easily about the rollers 24 and 27 and conform to the shape of these rollers if they are of tapered formation. Engagement of the shoe 46 with the ground limits upward tilting of the rear end of the main conveyor and also serves as a support for the front ends of the main conveyor and the auxiliary conveyor.

Having thus described the invention, what is claimed is:

1. A loader comprising a carriage, a main conveyor having a frame pivoted to said carriage for vertical tilting from a reclined position to a raised position in which it extends rearwardly at an upward incline, an endless conveyor belt in said frame having its upper flight moving toward the rear end of the frame when in motion, arms extending forwardly from opposite sides of the front end of said frame, a shoe of greater width than the conveyor carried by and projecting forwardly from said arms and extending transversely of the conveyor, and an auxiliary conveyor having a pan mounted over the forward portion of the main conveyor and projecting forwardly therefrom with its front end secured to the shoe, supports for the rear end of said pan extending upwardly from opposite sides of the frame of the main conveyor, struts rising from opposite sides of the frame of the main conveyor adjacent the rear end of said pan, bearings carried by said struts, a rear shaft rotatably mounted through said bearings, side bars having bearings at their rear ends receiving the shaft, troughs carried by and extending laterally from front ends of the side bars and open at their inner ends, bearings at front ends of the side bars, a front shaft rotatably mounted through the front bearings, conveyor screws at ends of the front shaft operating in the troughs, sprockets carried by said shafts, endless chains trained about the sprockets, and cross blades carried by said chains and having movement with the lower flights of the chains upwardly through the pan for carrying material through the tray and over the rear end thereof for deposit upon the conveyor belt of the main conveyor.

2. A loader comprising a carriage, a main conveyor having a frame pivoted to said carriage for vertical tilting from a reclined position to a raised position in which it extends rearwardly at an upward incline, an endless conveyor belt in said frame having its upper flight moving toward the rear end of the frame when in motion, arms extending forwardly from the front end of said frame, a shoe carried by said arms and extending transversely of the conveyor, and an auxiliary conveyor having a pan mounted over the forward portion of the main conveyor and projecting forwardly therefrom with its front end secured to the shoe, struts rising from opposite sides of the frame of the main conveyor adjacent the rear end of said pan, bearings carried by said struts, a rear shaft rotatably mounted through said bearings, side bars having bearings at their rear ends receiving the shaft, bearings at front ends of the side bars, a front shaft rotatably mounted through the front bearings, endless conveying means trained about the shafts and provided with members for moving material rearwardly through the pan and over the rear end thereof onto the belt of the main conveyor, lever arms extending rearwardly from the rear end of the auxiliary conveyor at opposite sides thereof, weights carried by the lever arms and shiftable along the same into position for counterbalancing the weight of the auxiliary conveyor and assisting upward swinging of the auxiliary conveyor about the rear shaft thereof to raised position.

JOHN N. FEES.